United States Patent
Vrzalik et al.

(10) Patent No.: US 10,034,808 B2
(45) Date of Patent: Jul. 31, 2018

(54) LOW-AIR-LOSS (LAL) PATIENT SUPPORT APPARATUSES AND METHODS

(71) Applicant: HUNTLEIGH TECHNOLOGY LIMITED, Dunstable (GB)

(72) Inventors: John H. Vrzalik, San Antonio, TX (US); Bruce Phillips, San Antonio, TX (US); Kz Hong, San Antonio, TX (US)

(73) Assignee: Huntleigh Technology Limited (GB)

( * ) Notice: Subject to any disclaimer, the term of this patent is extended or adjusted under 35 U.S.C. 154(b) by 0 days.

(21) Appl. No.: 14/426,665

(22) PCT Filed: Sep. 6, 2013

(86) PCT No.: PCT/US2013/058516
§ 371 (c)(1),
(2) Date: Mar. 6, 2015

(87) PCT Pub. No.: WO2014/039827
PCT Pub. Date: Mar. 13, 2014

(65) Prior Publication Data
US 2015/0231007 A1 Aug. 20, 2015

Related U.S. Application Data

(60) Provisional application No. 61/698,039, filed on Sep. 7, 2012.

(51) Int. Cl.
*A61G 7/00* (2006.01)
*A61G 7/057* (2006.01)
(Continued)

(52) U.S. Cl.
CPC ........ *A61G 7/05769* (2013.01); *A47C 27/006* (2013.01); *A47C 27/081* (2013.01);
(Continued)

(58) Field of Classification Search
CPC ...................................................... A61G 7/00
(Continued)

(56) References Cited

U.S. PATENT DOCUMENTS 5,509,155 A 4/1996 Zigarac et al.
2001/0020303 A1 9/2001 Endo et al.
(Continued)

FOREIGN PATENT DOCUMENTS

JP 2001161505 A 6/2001
JP 2007527303 A 9/2007
(Continued)

OTHER PUBLICATIONS

International Search Report issued for corresponding International Application No. PCT/US2013/058516, dated Jan. 8, 2014, 3 pages.

*Primary Examiner* — Fredrick C Conley
(74) *Attorney, Agent, or Firm* — The Webb Law Firm (57) ABSTRACT

Mattresses and cushions, methods of making mattresses and cushions, and patient supports comprising a mattress and/or a cushion. At least some embodiments of the present mattresses and cushions comprise a body with air-impermeable material having a plurality of openings, and a cover sheet comprising air-permeable and liquid-impermeable material covering at least a portion of the plurality of openings and coupled to the body by a liquid-impermeable welded seam encircling the covered one or more openings.

31 Claims, 8 Drawing Sheets

(51) Int. Cl.
*A47C 27/00* (2006.01)
*A61G 7/015* (2006.01)
*A47C 27/08* (2006.01)
*A47C 27/10* (2006.01)
*B32B 37/00* (2006.01)

(52) U.S. Cl.
CPC .............. *A47C 27/10* (2013.01); *A61G 7/015* (2013.01); *B32B 37/00* (2013.01); *A61G 2007/05784* (2013.01); *A61G 2007/05792* (2013.01); *B32B 2307/7265* (2013.01); *Y10T 156/10* (2015.01)

(58) Field of Classification Search
USPC .................................... 5/423, 710–714, 726
See application file for complete search history.

(56) References Cited

U.S. PATENT DOCUMENTS

| | | | |
|---|---|---|---|
| 2007/0261548 A1* | 11/2007 | Vrzalik | A47C 21/044 95/52 |
| 2008/0022461 A1* | 1/2008 | Bartlett | A47C 27/081 5/714 |
| 2008/0084095 A1 | 4/2008 | Wolas | |
| 2008/0098532 A1* | 5/2008 | Gowda | A61G 7/05769 5/713 |
| 2012/0065560 A1* | 3/2012 | Siegner | A61G 7/05776 601/150 |
| 2013/0298330 A1* | 11/2013 | Lachenbruch | A61G 7/057 5/606 |

FOREIGN PATENT DOCUMENTS

| | | |
|---|---|---|
| WO | 2005102242 A1 | 11/2005 |
| WO | 2008/014277 A2 | 1/2008 |

\* cited by examiner

FIG. 9B

LOW-AIR-LOSS (LAL) PATIENT SUPPORT APPARATUSES AND METHODS

CROSS-REFERENCE TO RELATED APPLICATIONS

This application is a National Phase application of International Application No. PCT/US2013/058516 filed on Sep. 6, 2013, and which claims priority to U.S. Provisional Patent Application Ser. No. 61/698,039, filed Sep. 7, 2012, and both of these applications are incorporated by reference herein.

FIELD OF THE DISCLOSURE

The present disclosure relates generally to beds and patient support surfaces, and, more particularly, but not by way of limitation, to patient supports having a low-air-loss (LAL) mattress and/or cushion with one or more inflatable chambers.

BACKGROUND OF THE DISCLOSURE

Various apparatuses are known in the art for supporting patients. For example, some hospital beds and other beds include a mattress with a plurality of inflatable chambers (e.g., transverse chambers) and/or a plurality of inflatable cushions. Some such support apparatuses have an articulable frame that includes a back or head section, a seat section, and a leg section, each of which may be pivotable relative to one or more of the other sections. Some such patient support apparatuses include a low-air-loss (LAL) mattress, cushion, or coverlet to encourage airflow through a patient support surface. Prior art LAL mattresses and cushions are generally liquid-permeable, and therefore bacteria-permeable, such that a separate liquid-impermeable and bacteria-barrier sheet is required to cover the LAL mattress or cushion for infection control, and/or laundering of the mattress, or cushion, is needed for disinfection.

SUMMARY OF THE DISCLOSURE

This disclosure includes embodiments of mattresses, cushions, patient support apparatuses, and methods.

Some embodiments of the present mattresses for a patient-support apparatus comprise: a mattress body comprising an air-impermeable material defining an upper side, a lower side, and one or more inflatable zones, the upper side including a plurality of openings configured to permit air to escape through the air-impermeable material from at least one of the one or more inflatable zones; and a cover sheet comprising an air-permeable, liquid-impermeable material covering one or more of the plurality of openings, wherein the cover sheet is coupled to the mattress body by a liquid-impermeable welded seam between the cover sheet and the mattress body and encircling the covered one or more openings; where the mattress is configured to be coupled to a fluid source to provide air to the mattress at a rate sufficient to maintain inflation of the one or more inflatable zones as air escapes through the plurality of openings.

In some embodiments, the welded seam prevents air from escaping between the mattress body and the cover sheet such that if air escapes through the openings of the mattress body the escaping air is directed through the cover sheet. In some embodiments, the mattress body comprises two or more inflatable layers, and a first one of the two or more layers includes the one or more inflatable zones. In some embodiments, the cover sheet comprises two or more layers. In some embodiments, the cover sheet comprises: a first layer comprising an air-permeable, liquid-impermeable membrane; and a second layer comprising a fabric material. In some embodiments, the cover sheet comprises three layers. In some embodiments, the cover sheet further comprises: a third layer comprising a non-absorbent material; where the first layer is disposed between the second layer and the third layer. In some embodiments, the layers are laminated together.

In some embodiments, the air-impermeable material of the mattress body comprises an inner surface and an outer surface, and the cover sheet is disposed closer to the outer surface than to the inner surface. In some embodiments, a first portion of the openings are disposed in a first one of the one or more inflatable zones, and a second portion of the openings are disposed in a second one of the one or more inflatable zones. In some embodiments, the air-impermeable material defines three inflatable zones, a first portion of the openings are disposed in a first one of the three inflatable zones, a second portion of the openings are disposed in a second one of the three inflatable zones, and a third portion of the openings are disposed in a third one of the three inflatable zones. In some embodiments, the cover sheet covers all of the plurality of openings.

In some embodiments, the cover sheet covers the first portion of the plurality of openings, and the mattress further comprises: a second cover sheet comprising an air-permeable, liquid-impermeable material covering a second portion of the plurality of openings, the second cover sheet coupled to the mattress body by a liquid-impermeable welded seam between the second cover sheet and the mattress body and encircling the covered second portion of the plurality of openings. In some embodiments, the mattress body comprises a plurality of baffles dividing each of the two or more inflatable zones into a plurality of cells. In some embodiments, the first portion of the plurality of openings is disposed in a first one of the plurality of cells and the second portion of the plurality of openings is disposed in a second cell.

In some embodiments, the welded seam comprises coalesced portions of the cover sheet and the air-impermeable material of the mattress body. In some embodiments, the welded seam comprises a portion of the air-impermeable material of the mattress body extending into interstices of at least a portion of the cover sheet. In some embodiments, the welded seam comprises a sacrificial material disposed between the cover sheet and the air-impermeable material of the mattress body.

Some embodiments of the present patient-support apparatuses comprise: a deck having a seat portion, a leg portion, and a back or head portion configured to pivot between a lowered position and a raised position; an embodiment of the present mattresses; and a fluid source coupled to the air mattress and configured provide air to the mattress at a rate sufficient to maintain inflation of the one or more inflatable zones as air escapes through the plurality of openings.

Some embodiments of the present cushions for a patient-support apparatus comprise: a cushion body comprising an air-impermeable material defining an upper side, a lower side, and an inflatable chamber, the upper side including a plurality of openings configured to permit air to escape through the air-impermeable material from the inflatable chamber, and a cover sheet comprising an air-permeable, liquid-impermeable material covering one or more of the plurality of openings, wherein the cover sheet is coupled to the cushion body by a liquid-impermeable welded seam between the cover sheet and the mattress body and encircling the covered one or more openings; where the cushion is configured to be coupled to a fluid source to provide air to the cushion at a rate sufficient to maintain inflation of the inflatable chamber as air escapes through the plurality of openings.

In some embodiments, the welded seam prevents air from escaping between the cushion body and the cover sheet such that if air escapes through the openings of the cushion body the escaping air is directed through the cover sheet. In some embodiments, the cushion body comprises two or more inflatable layers, and a first one of the two or more layers includes the inflatable chamber.

In some embodiments, the cover sheet comprises two or more layers. In some embodiments, the cover sheet comprises: a first layer comprising an air-permeable, liquid-impermeable membrane; and a second layer comprising a fabric material. In some embodiments, the cover sheet comprises three or more layers. In some embodiments, the cover sheet further comprises: a third layer comprising a non-absorbent material; where the first layer is disposed between the second layer and the third layer. In some embodiments, the layers are laminated together.

In some embodiments, the air-impermeable material of the mattress body comprises an inner surface and an outer surface, and the cover sheet is disposed closer to the outer surface than to the inner surface. In some embodiments, the cover sheet covers all of the plurality of openings. In some embodiments, the welded seam comprises coalesced portions of the cover sheet and the air-impermeable material of the mattress body. In some embodiments, the welded seam comprises a portion of the air-impermeable material of the mattress body extending into interstices of at least a portion of the cover sheet. In some embodiments, the welded seam comprises a sacrificial material disposed between the cover sheet and the air-impermeable material of the mattress body.

Some embodiments of the present methods of making a low-air-loss mattress for a patient-support apparatus, comprise: coupling a cover sheet to a mattress body comprising an air-impermeable material defining an upper side, a lower side, and one or more inflatable zones, the upper side including a plurality of openings configured to permit air to escape through the air-impermeable material from at least one of the one or more inflatable zones; where the cover sheet comprises an air-permeable, liquid-impermeable material and covers one or more of the plurality of openings, wherein the cover sheet is coupled to the mattress body by a liquid-impermeable welded seam encircling the covered one or more openings.

Some embodiments of the present methods of making a low-air-loss cushion for a patient-support apparatus, comprise: coupling a cover sheet to a cushion body comprising an air-impermeable material defining an upper side, a lower side, and an inflatable chamber, the upper side including a plurality of openings configured to permit air to escape through the air-impermeable material from the inflatable chamber; where the cover sheet comprises an air-permeable, liquid-impermeable material and covers one or more of the plurality of openings, the cover sheet coupled to the cushion body by a liquid-impermeable welded seam encircling the covered one or more openings.

Any embodiment of any of the present devices and kits can consist of, or consist essentially of—rather than comprise/include/contain/have—any of the described steps, elements, and or features. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures may be drawn to scale, meaning the sizes of the depicted elements are accurate relative to each other, for some embodiments. Dimensions shown in the figures are exemplary and not limiting.

DESCRIPTION OF ILLUSTRATIVE EMBODIMENTS

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a device or kit that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps.

Further, a device or system that is configured in a certain way is configured in at least that way, but it can also be configured in other ways than those specifically described.

Embodiments of the present mattresses and cushions comprise an air-impermeable material (e.g., polymer film or laminated fabric) that defines one or more inflatable zones or chambers. An upper portion of the air-impermeable material can be perforated or provided with openings to let air escape from the inflatable zone(s) or chamber(s), such as, for example, at a desired or pre-determined rate when the inflatable zone(s) or chamber(s) are inflated at an expected operating pressure or within a range of acceptable operating pressures pressure (e.g., greater than or equal to any one of, or between any two of: 4, 5, 6, 7, 8, 9, 10, 15, 20, 25, 30, or more inches $H_2O$). The openings or perforations can be evenly distributed across the surface or can be grouped or concentrated in certain areas of the mattress or cushion to provide an increased rate of air-flow. An additional layer (a cover sheet) of air-permeable, liquid impermeable, material (e.g., fabric such as Gore-Tex PTFE (polytetrafluoroethylene) fabric (e.g., a 3 layer Gore-Tex high-air-flow fabric)) or other material) can then be coupled to the air-impermeable material of the mattress or cushion by a continuous (e.g., liquid-impermeable) welded seam encircling at least some of the openings such that air escaping through the covered openings must pass through the cover sheet. This design concept can be used for an entire mattress or a single discrete cushion, in which several cushions make up a mattress. Such embodiments of the present mattresses and cushions can provide accurate and consistent air flow through the upper portion of the mattress or cushion while maintaining a liquid impermeable and air permeable support mattress. As such, embodiments of the present mattresses and cushions can be wiped down for infection control rather than being laundered. In contrast, prior art mattresses and LAL mattresses (e.g., with uncovered openings and/or stitched seams or other types of bonds) that do not require a separate LAL coverlet are generally liquid-permeable and cannot be disinfected in-place by simply wiping down with suitable disinfectants.

Most known LAL mattresses require a separate liquid-impermeable sheet to cover the entire mattress to prevent contamination of and into the LAL mattress and/or cushions. In contrast, embodiments of the present mattresses and cushions include an air-permeable, liquid-impermeable material sealed to the mattress or cushion body with a liquid-impermeable seam, eliminating the need for a separate liquid-impermeable sheet, permitting health care facilities to disinfect the mattress or cushion (e.g., in-place) without special laundering equipment or off-site laundering. As such, embodiments of the present mattresses and cushions can be covered with an air-permeable (e.g., and liquid-permeable) sheet (e.g., a standard cotton or other fabric sheet) that can be laundered with other textiles.

In embodiments of the present mattresses and cushions, air flow rate can be controlled by the number and size of openings perforations (e.g., about 0.06 inches or 1 mm in diameter) in the liquid-impermeable material of the mattress or cushion, such that the airflow can be directed through a relatively large area (e.g., many square inches) of the air-permeable, liquid-impermeable cover layer, reducing the likelihood of blockage in the pores of the air permeable layer. Additionally, in embodiments with a single liquid-impermeable, air-permeable cover sheet over the openings, the stress is distributed over a relatively large seam, potentially increasing durability.

In the present embodiments, the use of plastic welding techniques instead of stitched seams may also reduce labor required to manufacture the present mattresses and cushions, and generally result in improved durability than those with stitched seams that must be laundered for infection control. Further, the present embodiments offer a simplified structure for providing sufficient MVTR (moisture vapor transmission rate) in which a separate LAL coverlet and air mover are not required, potentially reducing electrical power consumption and noise. Additionally, in mattresses and cushions with sewn seams, the stitched seams are generally located on the bottom or the sides of the mattress or cushion, such that leaks result in a loss of air that does not contribute. In contrast, the seams of the present embodiments can be disposed on the upper surface or portion of the mattress such that even if leaks occur, airflow from those leaks are still directed in the vicinity of a patient.

Referring now to the drawings, and more particularly to FIGS. 1-4B, shown therein and designated by the reference numeral 10 is an embodiment of the present mattresses shown on a patient-support apparatus or bed 14. In this embodiment, mattress 10 comprises a mattress body 18 and a cover sheet 22. In the embodiment shown, mattress body 18 comprises an air-impermeable material (e.g., sheet material) 26 defining an upper side 30, a lower side 34, and two or more inflatable zones (e.g., a head zone 38, a body zone 42, and a foot zone 46, as shown). In some embodiments, such as the one shown, individual zones are isolated from adjacent zones. In other embodiments, individual zones may be in fluid communication with adjacent zones. As shown, upper side 30 includes a plurality of openings 50 configured to permit air to escape through the air-impermeable material from at least one of the two or more inflatable zones. The air-impermeable material of mattress body 18 may, for example, comprise polyurethane, polyvinyl chloride (PVC), laminated fabric, and/or any other material (e.g., polymer) that is air-impermeable (e.g., and liquid impermeable) and sufficiently durable for a mattress to enable mattress body 18 to function as described in this disclosure.

In the embodiment shown, cover sheet 22 comprises an air-permeable, liquid-impermeable material 54 covering one or more of the plurality of openings 50. For example, in this embodiment, material 26 of the mattress body includes an inner surface and an outer surface, and (as shown) cover sheet 22 is disposed closer to the outer surface than the inner surface (is disposed outside the inflatable chamber and welded to the outer surface, rather than being disposed inside the inflatable chamber and welded to the inner surface). In the embodiment shown, openings 50 are substantially circular and each has a diameter of 1 millimeter (mm). In other embodiments, openings 50 can have any shape (e.g., square, rectangular, triangular, oval, irregular, etc.) and/or size (e.g., transverse dimension of greater than any one of, or between any two of: 1 mm, 1.2 mm, 1.4 mm, 1.6 mm, 1.8 mm, 2 mm, or more) that permits mattress 10 to function as described in this disclosure. In the embodiment shown, the center-to-center lateral spacing between adjacent openings (in each cell) is either 2 inches or 4 inches, as indicated by the relative sizes of the depicted spaces. Other embodiments can have any suitable size, number, spacing, or arrangement of openings. In this embodiment, cover sheet 22 is coupled to mattress body 18 by a liquid-impermeable (e.g., and air-impermeable or air- and vapor-permeable) welded seam 58 between the cover sheet and the mattress body (e.g., below the cover sheet and above the mattress body). In this embodiment, welded seam 58 also completely encircles the covered one or more openings, as shown, such that air exiting the covered one or more openings 50 must pass through cover sheet 22 to escape to the surrounding atmosphere. In some embodiments, a welded seam 58 extends over and along the length of each baffle 62 to isolate the air flow from openings 50 to exhaust through the portion of cover sheet 22 that is directly over the respective cell 66 (e.g., with no cross flow of air across cells 66 between mattress body 18 and cover sheet 22). In some embodiments, cover sheet 22 comprises two or more layers (e.g., a first layer comprising an air-permeable, liquid-impermeable membrane; and a second layer comprising a fabric or other material). In some embodiments, cover sheet 22 comprises three layers (e.g., a first layer comprising an air-permeable, liquid-impermeable membrane; and a second layer comprising a fabric material, and a third layer comprising a non-absorbent material; where the first layer is disposed between the second layer and the third layer). In embodiments with such multi-layer cover sheets, the layers may be laminated together. Examples of air-permeable (e.g., and vapor permeable), liquid-impermeable materials that are suitable for the cover sheet in at least some of the present embodiments comprise fabrics sold under the name Gore-Tex® and/or nonwoven sheet materials sold under the name Tyvek®.

Figure 1:
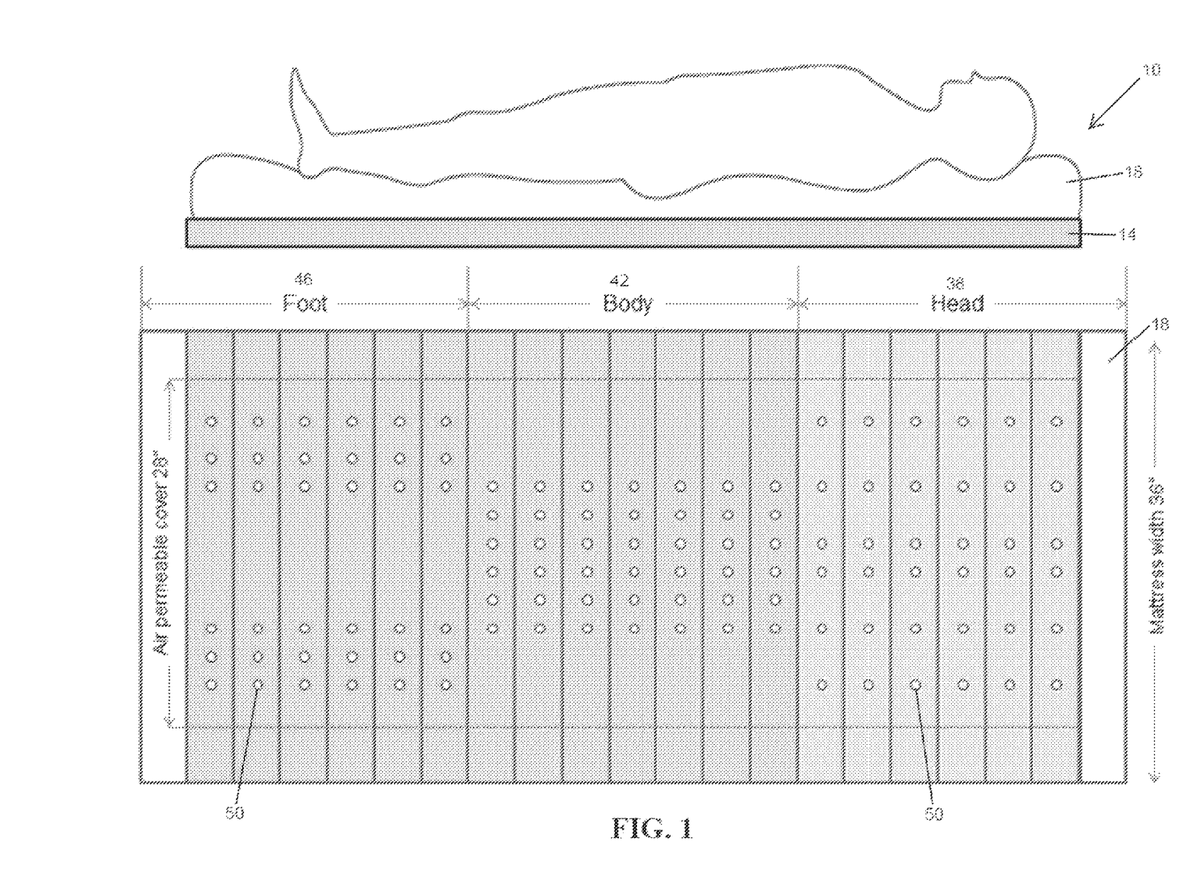
FIG. 1 depicts a top view of a mattress body of an embodiment of a mattress body suitable for use in at least some embodiments of the present mattresses.
Figure 4A:
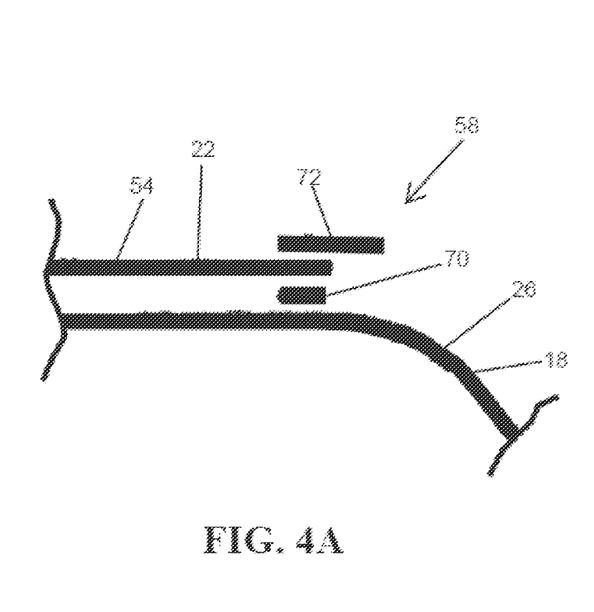
FIGS. 4A and 4B depict exploded cross-sectional views of certain details of the mattress of FIG. 2.
Figure 4B:
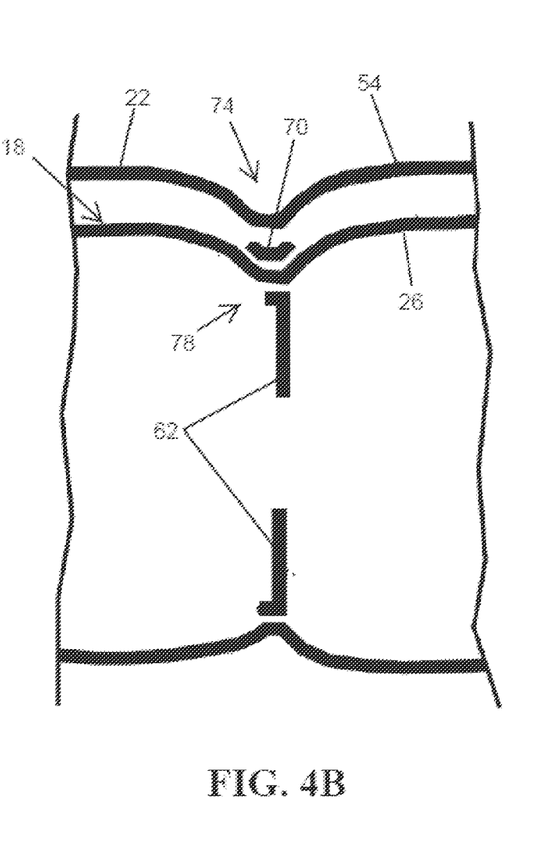

As noted above, in the embodiment shown, mattress body 18 includes two or more (e.g., three) zones (e.g., a head zone 38, a body zone 42, and a foot zone 46, as shown), each of which comprises one or more inflatable chambers. In this embodiment, a first portion of openings 50 are disposed in a first one of the three inflatable zones (e.g., head zone 38), a second portion of openings 50 are disposed in a second one of the three inflatable zones (e.g., body zone 42), and a third portion of the openings are disposed in a third one of the three inflatable zones (e.g., foot zone 46). In this embodiment, cover sheet 22 covers all of openings 50, as shown. In some embodiments, such as the one shown (see, e.g., FIG. 4B), mattress body 18 comprises a plurality of baffles 62 dividing each of the two or more inflatable zones into a plurality of cells 66. For example, in this embodiment, head zone 38, body zone 42, and foot zone 46 each comprises seven cells 66, as shown. In the embodiment shown, individual cells 66 may be in fluid communication with at least one of two adjacent cells. In other embodiments, individual cells 66 may be isolated from adjacent cells. In some embodiments, such as the one shown, a first portion of the plurality of openings 50 can be disposed in a first one of the plurality of cells 66 and a second portion of the plurality of openings 50 can be disposed in a second cell 66. For example, in the embodiment shown, six of seven cells in head zone 38 each includes a portion (six) of the plurality of openings 50, all seven cells in body zone 42 each includes a portion (six) of the plurality of openings 50, and six of seven cells in foot zone 46 each includes a portion (six) of the plurality of openings 50. Although baffle 62 in FIG. 4B is shown as permitting communication between adjacent cells 66, some or all of the baffles between adjacent cells may prevent communication between adjacent cells (e.g., may be solid). For example, a baffle between head zone 38 and body zone 42 may prevent communication between cells 66 of the respective zones (e.g., such that inflation of head zone 38 and body zone 42 may be separately controlled), and/or a baffle between body zone 42 and foot zone 46 may prevent communication between cells 66 of the respective zones (e.g., such that inflation of body zone 42 and foot zone 46 may be separately controlled).

Seam 58 can comprise a liquid-impermeable welded seam between cover sheet 22 and mattress body 18. Seam 58 can be formed by any suitable plastic-welding methods such as, for example, radio frequency (RF) welding, ultrasonic welding, heat or thermal welding, solvent welding, or any other process that softens and/or liquefies the polyurethane or other material of the mattress body (e.g., and of a slave or sacrificial material 70 between the mattress body and the cover sheet). For example, in the embodiment shown, seam 58 can be formed by positioning a sacrificial material 70 (e.g., comprising the same material as mattress body 18) and RF welding to soften and coalesce the material of the mattress body with sacrificial material 18, and to soften sacrificial material to cause sacrificial material 18 to seep into interstices in cover sheet 22 (e.g., into interstices in at least a fabric or mesh layer of cover sheet 22) with or without coalescence of sacrificial material 70 and the material of cover sheet 22 (e.g., a nylon or other polymer layer of cover sheet 22). In the embodiment shown, a heat-seal or other seam tape 72 (e.g., as is available from Bemis Company, Inc., U.S.A.) is applied over a peripheral edge of cover sheet 22, as shown. In other embodiments, sacrificial material 70 is omitted such that the welded seam is formed directly between cover sheet 22 and mattress body 18 (e.g., with or without coalescence of material 26 of the mattress body and material 54 of the cover sheet), and/or tape 72 is omitted.

In the embodiment shown, a secondary welded seam 74 may also be provided between zones of the mattress (e.g., between head zone 38 and body zone 42 and/or between body zone 42 and foot zone 46) and/or between adjacent cells 66 within a zone (e.g., one or more of head zone 38, body zone 42, and foot zone 46). In this embodiment, welded seam 74 is similar to welded seam 58 in that welded seam 74 also includes a sacrificial material 70 and can be formed by similar welded methods. In the embodiment shown, baffle 62 is also welded (e.g., RF welded) to the outer material of mattress body 18 and a welded seam 78 between baffle 62 and the outer material of mattress body 18 may align with welded seam 74. Welded seams 74 and 78 may be formed simultaneously or may be formed sequentially. In other embodiments, welded seam 74 is offset from welded seam 78.

Figure 2:
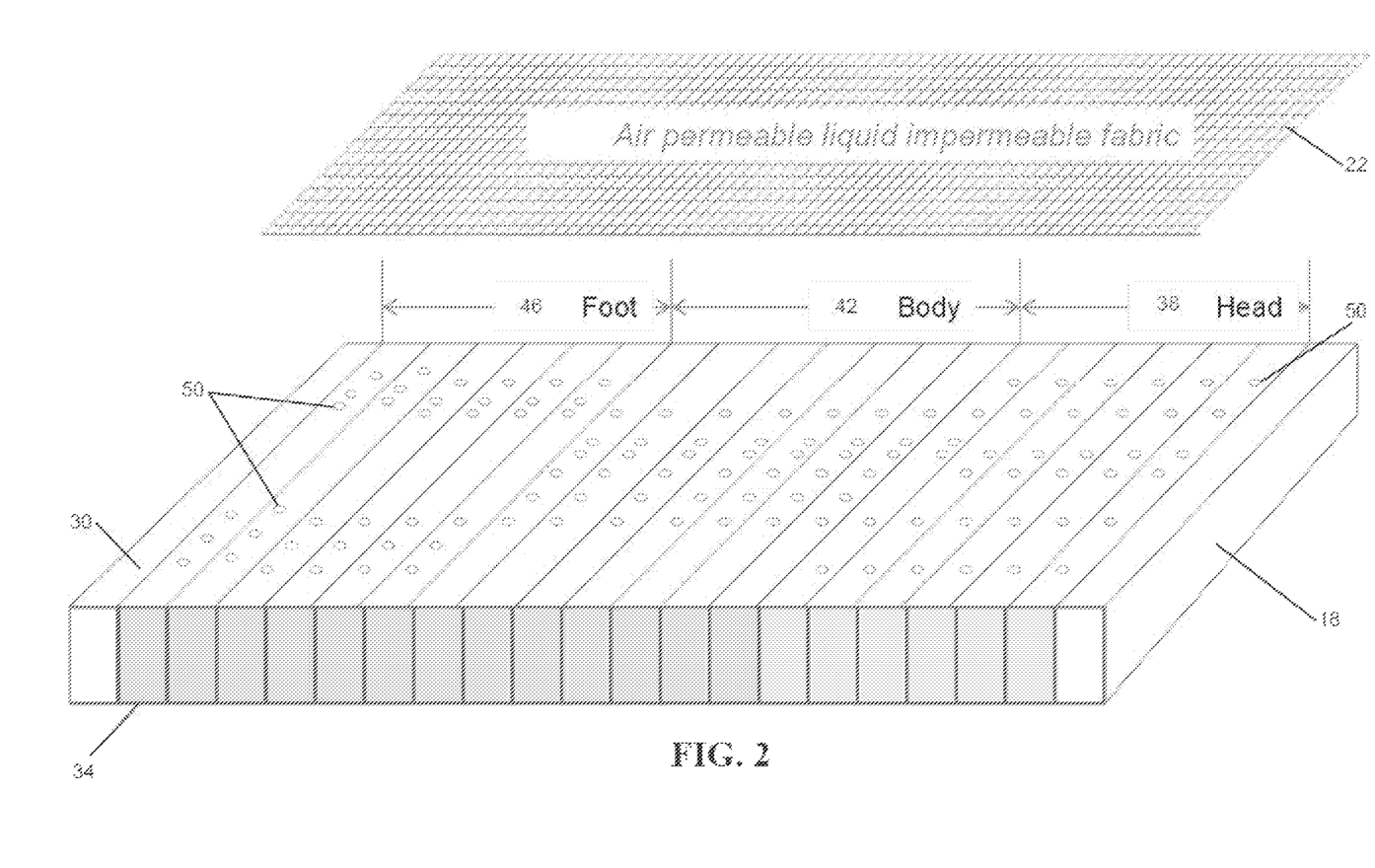
FIG. 2 depicts an exploded view of an embodiment of the present mattresses including the mattress body of FIG. 1 and a cover sheet.
Figure 3:
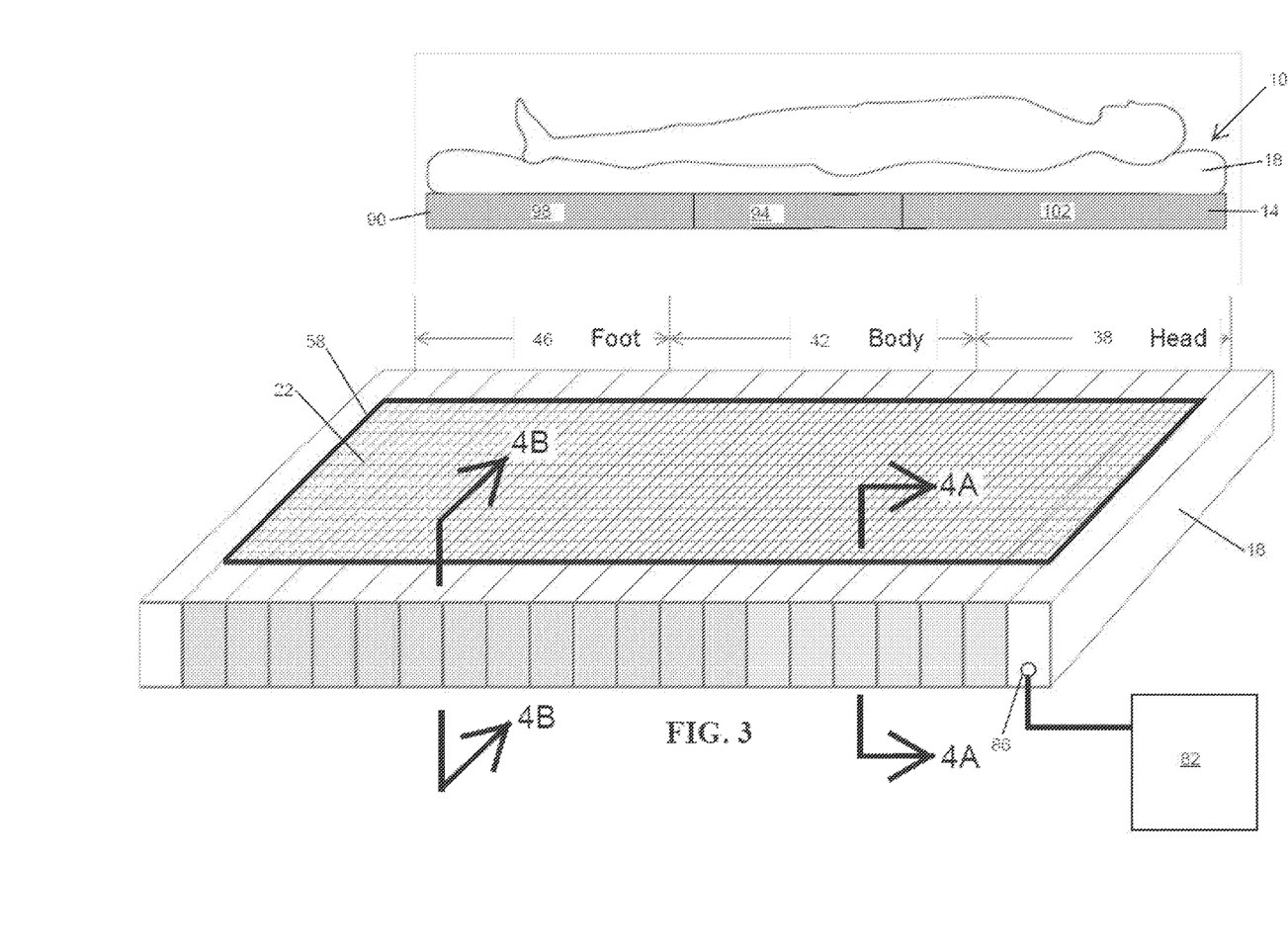
FIG. 3 depicts a perspective view of the mattress of FIG. 2.

In the embodiment shown, mattress 10 can be configured to be coupled to a fluid source 82 to provide air to the mattress at a rate sufficient to maintain inflation of the two or more inflatable zones as air escapes through the plurality of openings. For example, in the embodiment shown, mattress body 18 includes a port 86. In other embodiments, the mattress can include multiple ports (e.g., one for each of head zone 38, body zone 42, and foot zone 46, such that zones 38, 42, 46 can be inflated and/or pressurized independently). In embodiments of the present mattresses that include multiple distinct zones that can be inflated and/or pressurized independently, different zones can be inflated at different pressures and/or the mattress can be configured and/or inflated as an alternating pressure pad (e.g., in a 1-in-2 or 1-in-3 cell arrangement). In other embodiments, mattress body 18 can comprise two or more inflatable layers (e.g., with baffles separating each zone and/or cell into an upper layer and a lower layer).

Figure 9A:
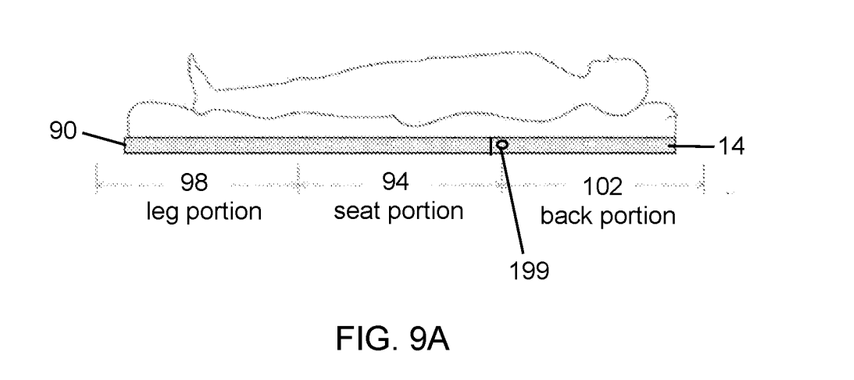
FIG. 9A depicts an embodiment of a deck in a lowered position and FIG. 9B depicts an embodiment of the deck in a raised position.
Figure 9B:
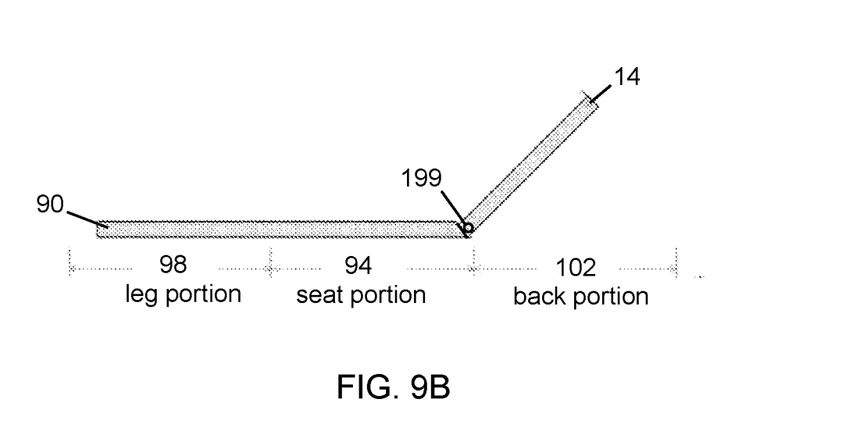

In some embodiments, patient support 14 comprises a deck 90 having a seat portion 94, a leg portion 98, and a back portion 102 configured to pivot 199 between a lowered position, as shown in FIG. 9A, and a raised position, as shown in FIG. 9B.

Some embodiments of methods of making the present mattresses can comprise coupling a cover sheet (e.g., 22) to a mattress body (e.g., 18) comprising an air-impermeable material (e.g., 26) defining an upper side (e.g., 30), a lower side (e.g., 34), and two or more inflatable zones (e.g., 38, 42, 46), the upper side including a plurality of openings (e.g., 50) configured to permit air to escape through the air-impermeable material from at least one of the two or more inflatable zones; and where the cover sheet comprises an air-permeable, liquid-impermeable material (e.g., 54) and covers one or more of the plurality of openings, the cover sheet coupled to the mattress body by a liquid-impermeable welded seam (e.g., 58) encircling the covered one or more openings.

Figure 5:
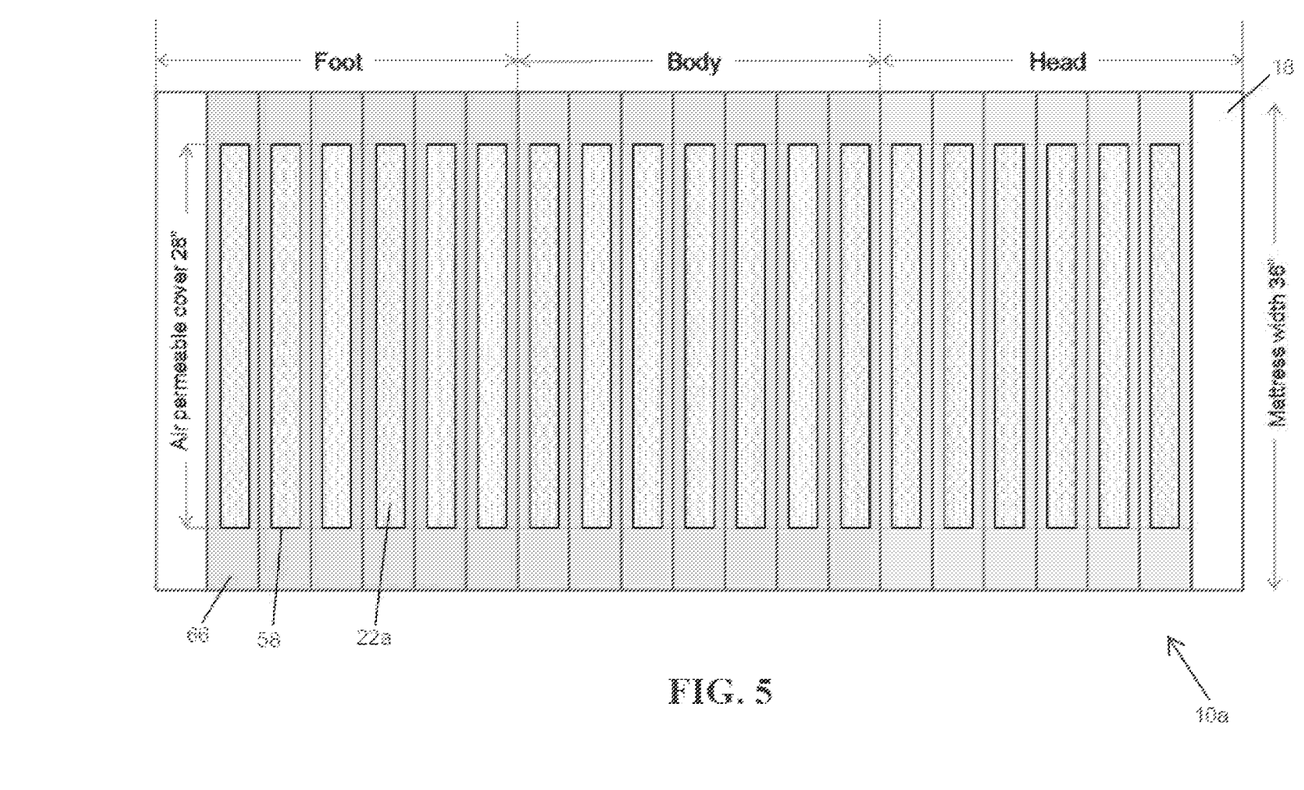
FIG. 5 depicts a top view of a second embodiment of the present mattresses.

FIG. 5 depicts a second embodiment 10a of the present mattresses. Mattress 10a is substantially similar to mattress 10, with the primary exception that mattress 10a includes a plurality of cover sheets 22a, each covering only the portion of the openings in a single cell 66 of mattress body 18, and each coupled to mattress body 18 by a welded seam 58 encircling only the covered portion of the openings.

Figure 6:
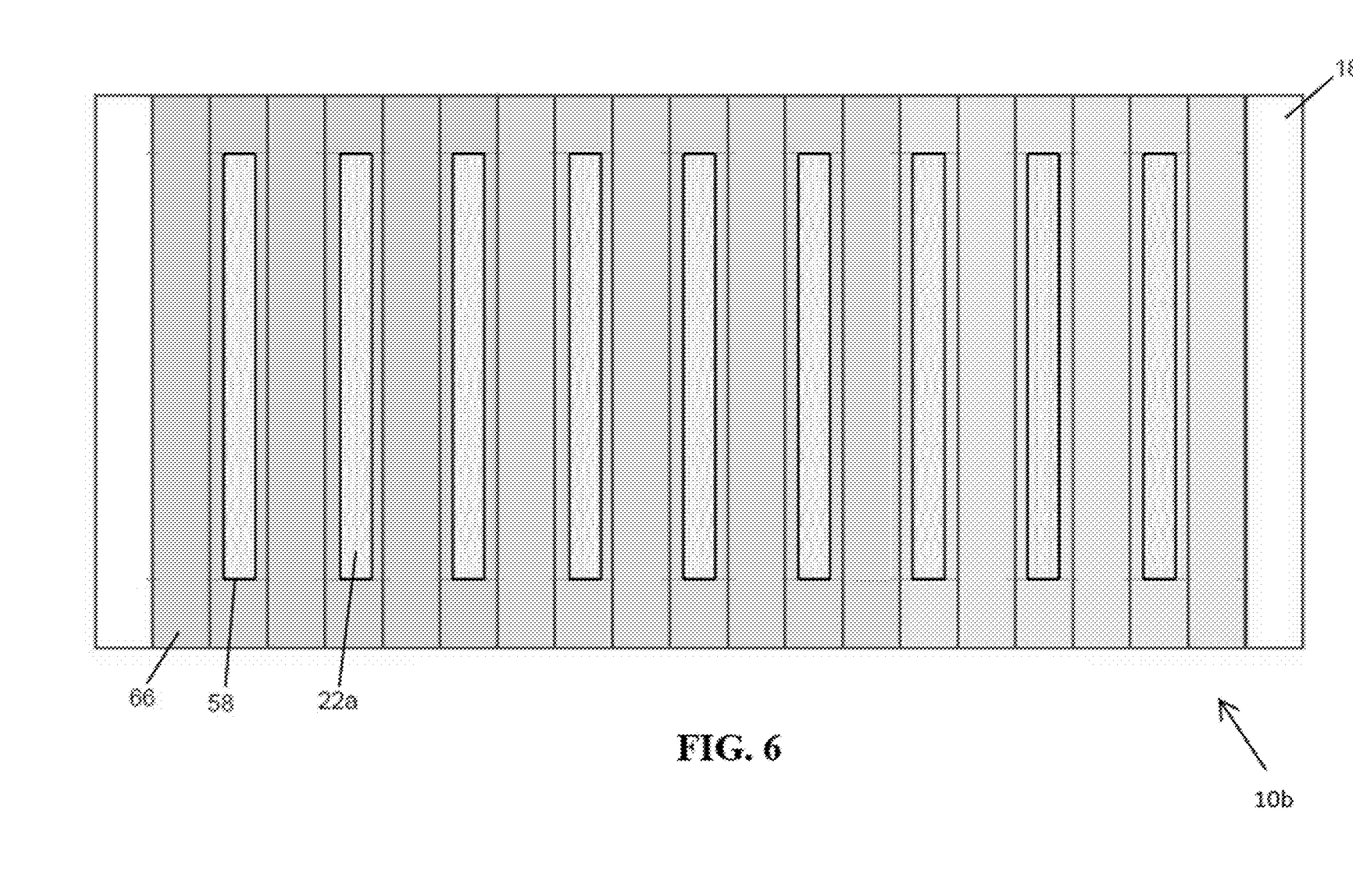
FIG. 6 depicts a perspective view of a third embodiment of the present mattresses.

FIG. 6 depicts a third embodiment 10b of the present mattresses. Mattress 10b is substantially similar to mattress 10a, with the primary exception that mattress 10b includes openings in every other cell 66 (and a corresponding number of cover sheets 22a).

Figures 7, 8A, 8B:
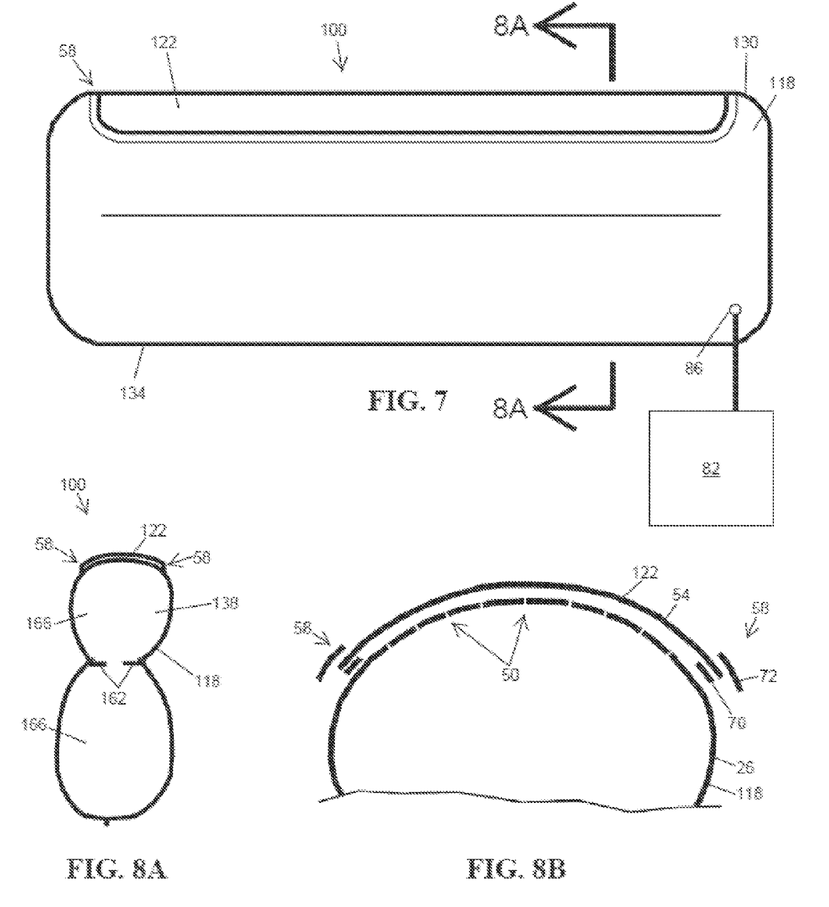
FIG. 7 depicts a side view of an embodiment of the present cushions.
FIG. 8A depicts an end cross-sectional view of the cushion of FIG. 7.
FIG. 8B depicts an exploded cross-sectional view of certain details of the cushion of FIG. 7.

FIGS. 7, 8A and 8B depict an embodiment 100 of the present cushions. Many of the features of cushion 100 are substantially similar to corresponding features of mattress 10. As such, similar reference numerals are used to refer to features of cushion 100 that are similar to mattress 10, and the additional description of cushion 100 primarily focuses on differences in cushion 100. In the embodiment shown, a plurality of cushions 100 can, for example, be disposed in series and disposed on a patient support (e.g., 14).

In the embodiment shown, cushion 100 includes a cushion body 118 and a cover sheet 122. In this embodiment, cushion body 118 comprises an air-impermeable material 26 defining an upper side 130, a lower side 134, and an inflatable chamber 138, the upper side including a plurality of openings 50 configured to permit air to escape through the air-impermeable material from the inflatable chamber. In this embodiment, cover sheet 122 comprises an air-permeable, liquid-impermeable material 54 covering one or more (e.g., all, as shown) of the plurality of openings 50. For example, in this embodiment, material 26 of the cushion body includes an inner surface and an outer surface, and (as shown) cover sheet 122 is disposed closer to the outer surface than the inner surface. In the embodiment shown, cover sheet 122 is coupled to cushion body 118 by a liquid-impermeable (e.g., and air-impermeable or air- and vapor-permeable) welded seam 58 between the cover sheet and the mattress body (e.g., below the cover sheet and above the mattress body). In this embodiment, welded seam 58 also completely encircles the covered one or more openings, as shown, such that air exiting the covered one or more openings 50 must pass through cover sheet 122 to escape to the surrounding atmosphere. In some embodiments, cover sheet 122 comprises two or more layers (e.g., a first layer comprising an air-permeable, liquid-impermeable membrane; and a second layer comprising a fabric material). In some embodiments, cover sheet 122 comprises three layers (e.g., a first layer comprising an air-permeable, liquid-impermeable membrane; and a second layer comprising a fabric material, and a third layer comprising a non-absorbent material; where the first layer is disposed between the second layer and the third layer). In embodiments with such multi-layer cover sheets, the layers may be laminated together. Examples of air-permeable (e.g., and vapor permeable), liquid-impermeable materials that are suitable for the cover sheet in at least some of the present embodiments are sold under the name Gore-Tex®.

In the embodiment shown, cushion 100 can be configured to be coupled to a fluid source 82 to provide air to the cushion at a rate sufficient to maintain inflation of the inflatable chamber as air escapes through the plurality of openings. For example, in the embodiment shown, mattress body 18 includes a port 86. In the embodiment shown, a baffle 162 (similar to baffle 62) extends laterally across chamber 138 to increase the height of the chamber 138 (e.g., to restrict lateral expansion of cushion body 118 to prevent cushion body 118 from inflating to a circular shape) and divides chamber 138 into two inflatable layers or cells 166. Other embodiments may omit baffle 162 or baffle 162 may be solid such that fluid communication is prevented between the upper and lower cells.

Some embodiments of methods of making the present cushions can comprise: coupling a cover sheet (e.g., 122) to a cushion body (e.g., 118) comprising an air-impermeable material defining an upper side (e.g., 130), a lower side (e.g., 134), and an inflatable chamber (e.g., 138), the upper side including a plurality of openings (e.g., 50) configured to permit air to escape through the air-impermeable material from the inflatable chamber; where cover sheet 122 comprises an air-permeable, liquid-impermeable material (e.g., 26) and covers one or more of the plurality of openings, wherein the cover sheet is coupled to the cushion body by a liquid-impermeable welded seam (e.g., 58) encircling the covered one or more openings.

The various illustrative embodiments of the present devices and kits are not intended to be limited to the particular forms disclosed. Rather, they include all modifications and alternatives falling within the scope of the claims. For example, embodiments other than the one(s) shown may include some or all of the features of the depicted embodiment(s).

The claims are not intended to include, and should not be interpreted to include, means-plus- or step-plus-function limitations, unless such a limitation is explicitly recited in a given claim using the phrase(s) "means for" or "step for," respectively.

It will be understood that the benefits and advantages described above may relate to one embodiment or may relate to several embodiments. It will further be understood that reference to 'an' item refers to one or more of those items, unless otherwise specified. The steps of the methods described herein may be carried out in any suitable order, or simultaneously, where appropriate.

Where appropriate, aspects of any of the examples described above may be combined with aspects of any of the other examples described to form further examples having comparable or different properties and addressing the same or different problems. It will be understood that the above description of embodiments is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this invention.

The invention claimed is:

1. A mattress for a patient-support apparatus, the mattress comprising:
a mattress body comprising an air-impermeable material defining an upper side, a lower side, and two or more inflatable zones, wherein the upper side includes a plurality of openings configured to permit air to escape through the air-impermeable material from the at least two or more inflatable zones, wherein the at least two or more inflatable zones include a first inflatable zone in which a first portion of the plurality of openings are disposed in a first configuration and a second inflatable zone in which a second portion of the plurality of openings are disposed in a second configuration that is different from the first configuration; and
a cover sheet comprising an air-permeable, liquid-impermeable material covering one or more of the openings in the first inflatable zone and in the second inflatable zone, wherein the cover sheet comprises two or more layers, wherein the cover sheet is coupled to the mattress body by a liquid-impermeable welded seam between the cover sheet and the mattress body and the liquid-impermeable welded seam encircles the covered openings; wherein the mattress is configured to couple to a fluid source to provide air to the mattress at a rate sufficient to maintain inflation of the two or more inflatable zones as air escapes through the plurality of openings.

2. The mattress of claim 1, wherein the welded seam prevents air from escaping between the mattress body and the cover sheet so that when air escapes through the openings of the mattress body the escaping air is directed through the cover sheet.

3. The mattress of claim 1, wherein the mattress body comprises two or more inflatable layers, and a first one of the two or more layers includes the two or more inflatable zones.

4. A patient-support apparatus comprising:
a deck having a seat portion, a leg portion, and a back portion configured to pivot between a lowered position and a raised position;
the mattress of claim 1, wherein the mattress is an air mattress; and
a fluid source coupled to the air mattress and configured to provide air to the air mattress at a rate sufficient to maintain inflation of the two or more inflatable zones as air escapes through the plurality of openings.

5. The mattress of claim 1, wherein the cover sheet comprises a first layer comprising an air-permeable, liquid-impermeable membrane; and a second layer comprising a fabric material.

6. The mattress of claim 5, wherein the cover sheet comprises three layers.

7. The mattress of claim 6, wherein the cover sheet further comprises
a third layer comprising a non-absorbent material, wherein the first layer is disposed between the second layer and the third layer.

8. The mattress of claim 1, wherein the layers are laminated together.

9. The mattress of claim 1, wherein the air-impermeable material of the mattress body comprises an inner surface and an outer surface, and the cover sheet is disposed closer to the outer surface than to the inner surface.

10. The mattress of claim 1, wherein the cover sheet covers the first portion of the plurality of openings, and the mattress further comprises:
a second cover sheet comprising an air-permeable, liquid-impermeable material covering the second portion of the plurality of openings, wherein the second cover sheet is coupled to the mattress body by a liquid-impermeable welded seam between the second cover sheet and the mattress body and that encircles the covered second portion of the plurality of openings.

11. The mattress of claim 1, wherein the air-impermeable material defines three inflatable zones, and the first portion of the openings are disposed in the first inflatable zone, the second portion of the openings are disposed in the second inflatable zone, and a third portion of the openings are disposed in a third one of the three inflatable zones.

12. The mattress of claim 11, wherein the cover sheet covers all of the plurality of openings.

13. The mattress of claim 12, wherein the mattress body comprises a plurality of baffles dividing each of the three inflatable zones into a plurality of cells.

14. The mattress of claim 13, wherein the first portion of the plurality of openings is disposed in a first one of the plurality of cells and the second portion of the plurality of openings is disposed in a second cell.

15. The mattress of claim 1, wherein the welded seam comprises coalesced portions of the cover sheet and the air-impermeable material of the mattress body.

16. The mattress of claim 1, wherein the welded seam comprises a portion of the air-impermeable material of the mattress body extending into interstices of at least a portion of the cover sheet.

17. The mattress of claim 16, wherein the welded seam comprises a sacrificial material disposed between the cover sheet and the air-impermeable material of the mattress body.

18. A method of making a low-air-loss mattress for a patient-supporting apparatus, the method comprising the step(s) of:
coupling a cover sheet to a mattress body comprising an air-impermeable material defining an upper side, a lower side, and two or more inflatable zones, wherein the upper side includes a plurality of openings configured to permit air to escape through the air-impermeable material from at least one of the one or more inflatable zones, wherein a first portion of the plurality of openings are disposed in a first configuration in a first inflatable zone and a second portion of the plurality of openings are disposed in a second configuration in a second inflatable zone that is different from the first configuration;
wherein the cover sheet comprises an air-permeable, liquid-impermeable material and covers one or more of the openings in the first inflatable zone and in the second inflatable zone, wherein the cover sheet comprises two or more layers, wherein the cover sheet is coupled to the mattress body by a liquid-impermeable welded seam encircling the covered openings.

19. A method of making a low-air-loss cushion for a patient-support apparatus, the method comprising the step(s) of:
coupling a cover sheet to a cushion body comprising an air-impermeable material defining an upper side, a lower side, and an inflatable chamber, wherein the upper side includes multiple openings configured to permit air to escape through the air-impermeable material from the inflatable chamber, wherein at least some of the openings are concentrated in a first area of the cushion and at least some of the openings are concentrated in a second area of the cushion, and wherein the concentration in the first area is different from the concentration in the second area, and wherein the cover sheet is coupled to the cushion body by a liquid-impermeable welded seam between the cover sheet and the mattress body and the liquid-impermeable welded seam encircles the covered plurality of the multiple openings;

wherein the cover sheet comprises an air-permeable, liquid-impermeable material and covers a plurality of the multiple openings, wherein the cover sheet comprises two or more layers, wherein the cover sheet is coupled to the cushion body by a liquid-impermeable welded seam encircling the covered plurality of multiple openings.

20. A cushion for a patient-support apparatus, the cushion comprising:
  a cushion body comprising an air-impermeable material defining an upper side, a lower side, and an inflatable chamber, wherein the upper side includes multiple openings configured to permit air to escape through the air-impermeable material from the inflatable chamber, wherein at least some of the openings are grouped in a first area of the cushion and at least some of the openings are grouped in a second area of the cushion; and
  a cover sheet comprising an air-permeable, liquid-impermeable material covering a plurality of the multiple openings, wherein the cover sheet comprises two or more layers, wherein the cover sheet is coupled to the cushion body by a liquid-impermeable welded seam between the cover sheet and the mattress body and the liquid-impermeable welded seam encircles the covered plurality of the multiple openings; wherein the cushion is configured to couple to a fluid source to provide air to the cushion at a rate sufficient to maintain inflation of the inflatable chamber as air escapes through the multiple openings.

21. The mattress of claim 20, wherein the welded seam prevents air from escaping between the cushion body and the cover sheet so that when air escapes through the openings of the cushion body the escaping air is directed through the cover sheet.

22. The cushion of claim 20, wherein the cushion body comprises two or more inflatable layers, and a first one of the two or more layers includes the inflatable chamber.

23. The cushion of claim 20, wherein the welded seam comprises coalesced portions of the cover sheet and the air-impermeable material of the cushion body.

24. The cushion of claim 20, wherein the cover sheet comprises a first layer comprising an air-permeable, liquid-impermeable membrane; and a second layer comprising a fabric material.

25. The cushion of claim 24, wherein the cover sheet comprises three or more layers.

26. The cushion of claim 25, wherein the cover sheet further comprises
  a third layer comprising a non-absorbent material, wherein the first layer is disposed between the second layer and the third layer.

27. The cushion of claim 20, wherein the layers are laminated together.

28. The cushion of claim 20, wherein the air-impermeable material of the cushion body comprises an inner surface and an outer surface, and the cover sheet is disposed closer to the outer surface than to the inner surface.

29. The cushion of claim 20, wherein the cover sheet covers all of the plurality of openings.

30. The cushion of claim 20, wherein the welded seam comprises a portion of the air-impermeable material of the cushion body extending into interstices of at least a portion of the cover sheet.

31. The cushion of claim 30, wherein the welded seam comprises a sacrificial material disposed between the cover sheet and the air-impermeable material of the cushion body.

\* \* \* \* \*